United States Patent [19]

Clark et al.

[11] Patent Number: 5,008,824

[45] Date of Patent: Apr. 16, 1991

[54] HYBRID AIR CHARGE CALCULATION SYSTEM

[75] Inventors: Walter F. Clark, Plymouth; Bor-Dong Chen, Dearborn, both of Mich.

[73] Assignee: Ford Motor Company, Dearborn, Mich.

[21] Appl. No.: 368,001

[22] Filed: Jun. 19, 1989

[51] Int. Cl.[5] .......... G06F 15/20

[52] U.S. Cl. .......... 364/431.05; 364/510; 73/118.2

[58] Field of Search .......... 364/431.01, 431.03, 364/431.04, 431.05, 510, 564; 123/445, 488, 494; 73/118.2, 861.02, 861.03, 195, 198

[56] References Cited

U.S. PATENT DOCUMENTS

| | | | |
|---|---|---|---|
| 4,446,523 | 5/1984 | Reinke | 364/431.05 |
| 4,599,694 | 7/1986 | Aposchauski et al. | 364/431.05 |
| 4,644,474 | 2/1987 | Aposchanski et al. | 364/431.05 |
| 4,664,090 | 5/1987 | Kabasin | 123/494 |
| 4,750,352 | 6/1988 | Kolhoff | 364/431.04 |
| 4,773,375 | 9/1988 | Okino et al. | 123/488 |
| 4,860,222 | 8/1989 | Schmidt et al. | 364/431.05 |
| 4,873,641 | 10/1989 | Nagaishi et al. | 364/431.03 |
| 4,879,656 | 11/1989 | Quigley et al. | 364/431.04 |

*Primary Examiner*—Parshotam S. Lall

*Assistant Examiner*—Michael Zanelli

*Attorney, Agent, or Firm*—Peter Abolins; Clifford L. Sadler

[57] ABSTRACT

A hybrid air charge calculation system for an internal combustion engine in which the air charge is obtained by using either the mass airflow sensor readings or the engine speed and throttle angle information. A decision logic selects either means based on the engine speed, throttle angle, and the mass airflow rate.

6 Claims, 2 Drawing Sheets

HYBRID AIR CHARGE CALCULATION SYSTEM

BACKGROUND OF THE INVENTION

1. Field of the Invention

This invention relates to an air charge measuring system for fuel injection engines.

2. Prior Art

In an electronic fuel control system for a fuel injection engine, the amount of fuel to be injected is calculated based upon the intake airflow. It is thus desirable to have an accurate method for obtaining the intake airflow in order to have a better control over the air fuel ratio. Both airflow metering systems and airflow calculation systems are known. The former measures the airflow directly by using an airflow sensor such as a vane meter or a hot wire-type mass airflow meter. The latter measures the airflow indirectly by calculating it based on engine operating conditions. One known airflow calculation system is the so-called speed density system in which the airflow is calculated based upon the intake manifold pressure and the engine speed. Another known airflow calculation system is the throttle angle-pressure method in which the airflow is calculated based upon the angle of the throttle in the throttle bore and the ratio of the intake manifold absolute pressure of the engine to the atmospheric pressure.

It is also known that each method mentioned above has advantages and disadvantages. Therefore, a number of systems which incorporate two different methods have been proposed. In these known hybrid systems, the more accurate method to measure the airflow is selected based upon the engine operation conditions. This results in better air fuel ration control, improved fuel efficiency, and reduced undesirable exhaust gases.

The intake airflow per intake stroke, which is the intake air charge, has to be obtained to calculate the amount of fuel to be injected. Therefore, instead of obtaining the intake airflow, one can measure the intake air charge to calculate the fuel pulse width. The intake air charge can be obtained by using the throttle angle information and the engine speed information. This is the so called speed-throttle method. One method of obtaining the air charge in a speed-throttle system is to use an air charge look up table which is obtained experimentally as a function of the engine speed and the throttle angle. The air charge can also be obtained by integrating the instantaneous airflow measured by an airflow meter such as the mass airflow meter over one engine intake stroke period. The instantaneous mass airflow is directly measured and obtained by sampling the sensor at a fixed-time interval, e.g., 1 ms. This is a mass airflow system.

As in the case of the airflow measuring systems, both air charge measuring systems have their own merits and disadvantages. In the mass air system the airflow and thus the air charge obtained are more accurate because they are directly measured. However, the accuracy is limited by the characteristics of the sensor. To be more specific, it is accurate only when the airflow is not too high. The speed-throttle system costs less, because there is no need for a mass airflow sensor, and has a broader operating range. On the other hand, the air charge obtained is less accurate since it is obtained indirectly from the engine speed and the throttle angle. In some applications where a large range of RPM operating capabilities is required, the mass airflow readings obtained at high RPM's may be much lower than the actual mass airflow because of the sensor's characteristics. In this case, the air charge obtained using the engine speed and the throttle position information is more accurate.

It would be desirable to have a hybrid system which combines the mass air system and the speed-throttle system so that the most appropriate method can be selected under all engine operating conditions to obtain the most accurate air charge. These are some of the problems this invention overcomes.

Hybrid systems are known. For example, U.S. Pat. No. 4,644,474 issued to Apposchanski et al teaches selecting between the more accurate of two airflow determinations. One determination measures a parameter characterizing airflow into the engine that has an adaptive correction. Another calculates airflow into the engine as a function of engine speed and air density and has an adaptive correction. The patent teaches determining both airflows before deciding which airflow to use. This clearly necessitates at least one redundant airflow determination.

U.S. Pat. No. 4,773,375 issued to Okino et al teaches fuel injection control based on an intake airflow rate sensing system and fuel injection control based on a speed density system depending upon the amount of intake air.

U.S. Pat. No. 4,664,090 issued to Kabasin teaches a system for measuring the airflow into the engine using a pair of airflow measuring concepts selectively enabled dependent upon engine operation so as to accurately achieve a measurement of airflow over the full range of engine operation. The patent teaches measuring airflow utilizing speed density and a throttle angle pressure methods by selectively employing each of the methods in engine operating regions at which it is best suited for air measurement.

SUMMARY OF THE INVENTION

The present invention provides a hybrid air charge measuring system which combines the mass air system and the speed-throttle system so that the most appropriate method can be selected under all engine operating conditions to obtain more accurate air charge.

In the present invention, a hybrid air charge calculation system includes a mass air system, a speed-throttle system, and a decision logic to select which method to use to obtain more accurate air charge and thus more accurate fuel pulse width. In one embodiment of this invention, the decision logic monitors three engine operation parameters at all times. They are the throttle angle, engine revolution speed, and the intake airflow obtained by sensing the mass airflow sensor. The mass air system samples the instantaneous mass airflow at fixed time intervals. Such instantaneous airflow is integrated over one engine intake stroke period to obtain the air charge. Note that the mass airflow system is always activated at fixed time intervals to obtain the air charge. However, the air charge thus obtained is not used as the system's actual air charge until the decision logic decides to select such air charge. On the other hand, the speed-throttle system is only activated when the engine operation conditions are satisfied. When the speed-throttle system is activated by the decision logic, a predetermined air charge look up table is used to obtain the appropriate air charge based upon the throttle angle and the engine speed.

DESCRIPTION OF THE PREFERRED EMBODIMENT

Figure 1:
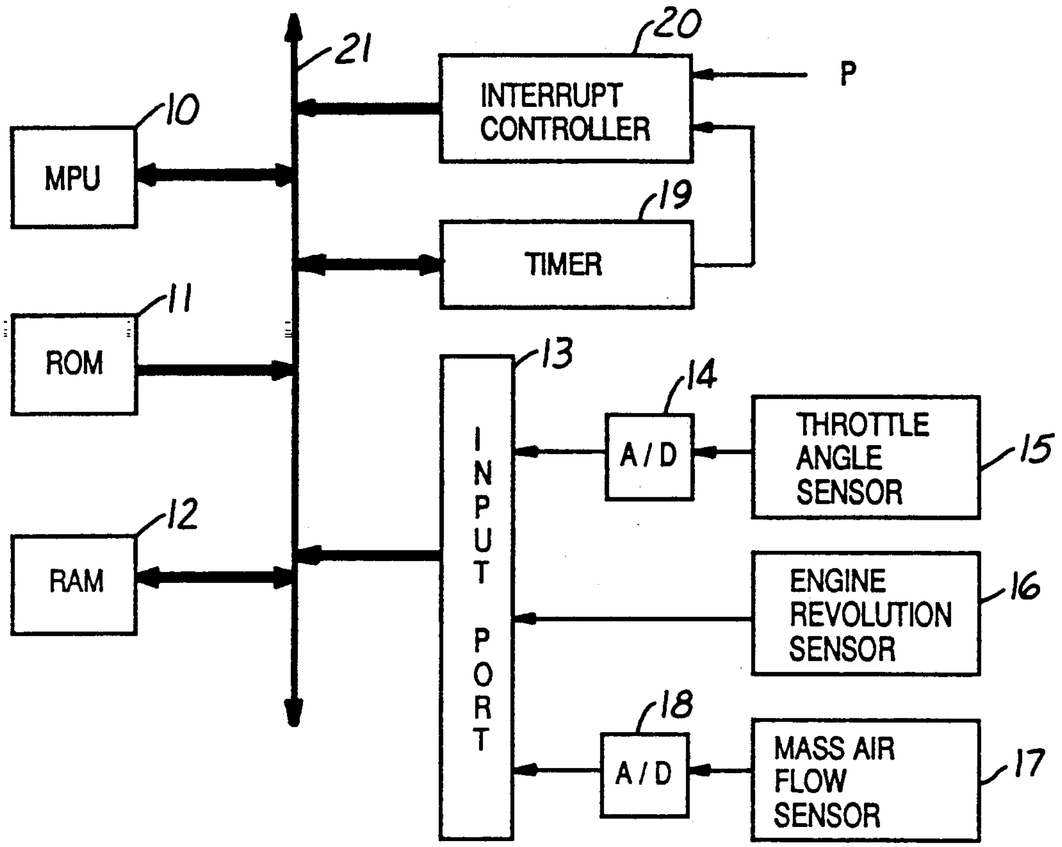
FIG. 1 is a block diagram of the control circuit in accordance with an embodiment of this invention.

FIG. 1 shows the block diagram of the control circuit in accordance with an embodiment of this invention. MPU 10 is the microprocessor unit which executes the control program stored in a ROM 11 and handles the interrupt requests issued by an interrupt controller 20. A RAM 12 is used to store temporary data or constants, such as throttle angle, engine revolution speed, and instantaneous mass airflow, etc. An input port 13 is used to transfer data from a throttle angle sensor 15, an engine revolution sensor 16, and a mass airflow sensor 17 to RAM 12. Two A/D converters 14, 18 are used to convert the analog signals from throttle angle sensor 15 and mass airflow sensor (MAFS) 17, respectively, into digital values. A timer 19 is used to store a preset time which is continuously counted down until underflow occurs, in which case an interrupt signal is sent from timer 19 to interrupt controller 20, which then notifies MPU 10 to take appropriate actions, such as executing a special routine. Interrupt controller 20 also receives an input signal P indicating the beginning of an intake stroke period. All these components are interconnected by an internal bus 21.

Figure 2:
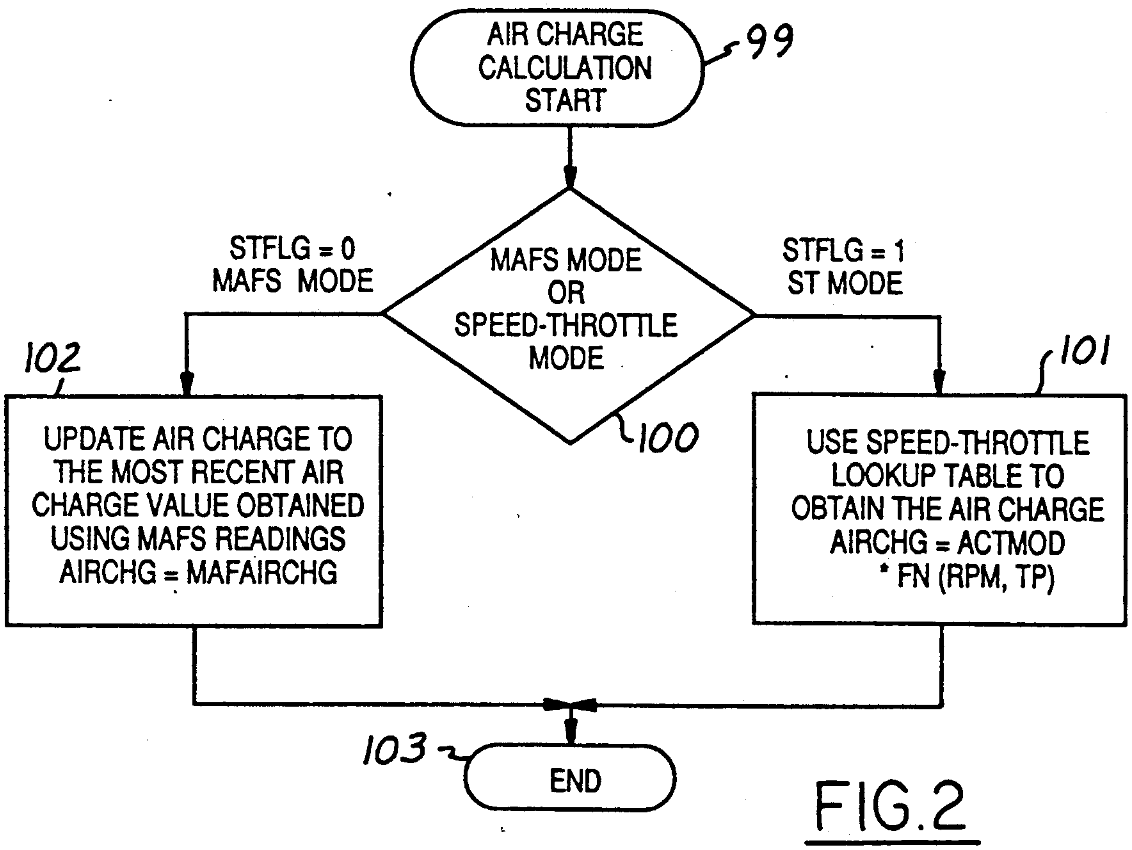
FIG. 2 is a flow chart of the hybrid air charge calculation system in accordance with an embodiment of this invention.

FIG. 2 shows a flow chart for a hybrid air charge calculation system starting at a block 99. It includes a decision logic block 100 which selects either the mass airflow method or the speed-throttle method based on the throttle angle, engine speed, and mass airflow. This decision logic will be described later. If the speed-throttle method is selected at block 100, the engine speed and the throttle angle are used to look up a value in a predetermined table FN(RPM,TP). The air charge AIRCHG is then obtained by multiplying FN(RPM,TP) by a multiplier ACTMOD as shown in block 101. If the mass airflow method is selected at block 100, the air charge is obtained at block 102 by replacing it with a value which is calculated once every engine intake stroke by integrating the instantaneous mass airflow sampled at fixed-time interval over an intake stroke period. The air charge obtained either at block 101 or at block 102 is then used in calculating the fuel pulse width for the fuel injectors. Logic flow from blocks 101 and 102 goes to an end block 103.

Figure 3:
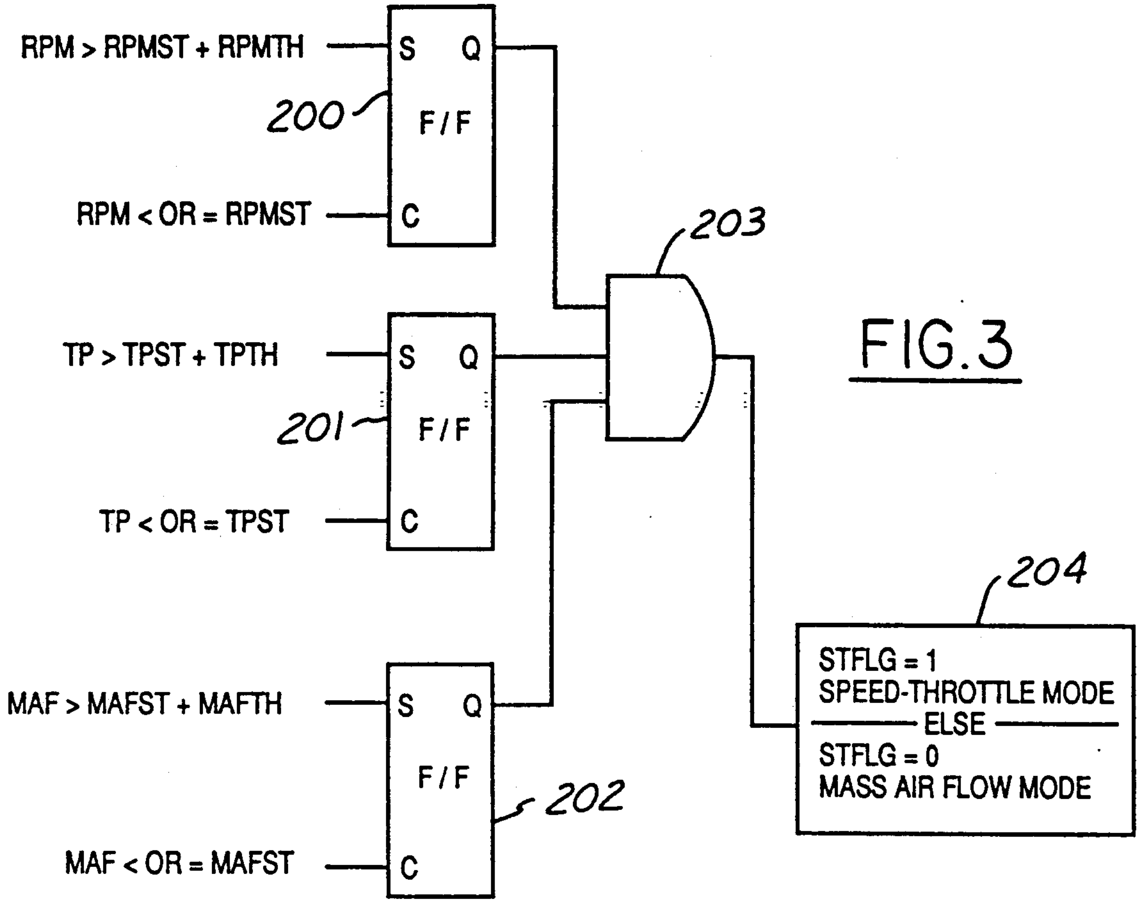
FIG. 3 is the logic diagram of the decision logic of the hybrid system in accordance with an embodiment of this invention.

The decision logic to select either the mass airflow mode or the speed-throttle mode is shown in FIG. 3. The decision logic includes three set-clear flip-flops 200, 201, 202 and an AND logic 203. A set-clear flip-flop has a set input S, a clear input C, and an output Q. When the set input is true, regardless of the clear input, the output of the flip-flop is true. When the clear input is true and the set input is false, the output of the flip-flop is false. When both the set input and the clear input are false, the output of the flip-flop remains unchanged.

In set-clear flip-flop 200, the set input is true when the engine speed (RPM) is greater than the sum of the engine speed threshold (RPMST) necessary to exit the mass airflow mode plus the speed hysteresis (RPMTH) to enter the speed-throttle mode. The clear input of flip-flop 200 is true when the engine speed is less than or equal to the engine speed threshold (RPMST) necessary to exit the mass airflow mode.

In set-clear flip-flop 201, the set input is true when the throttle angle (TP) is greater than the sum of the throttle angle threshold (TPST) necessary to exit the mass airflow mode plus the hysteresis (TPTH) to enter the speed-throttle mode. The clear input of flip-flop 201 is true when the throttle angle is less than or equal to the throttle angle threshold (TPST) necessary, to exit the mass airflow mode.

In flip-flop 202, the set input is true when the instantaneous mass airflow reading (MAF) is greater than the sum of the mass airflow threshold (MAFST) necessary to exit the mass airflow mode plus the hysteresis (MAFTH) to enter the speed-throttle mode. The clear input of flip-flop 202 is true when the mass airflow reading is less than or equal to the threshold (MAFST) necessary to exit the mass airflow mode.

The Q outputs of flip-flops 200, 201, and 202 are applied as inputs to AND logic 203. If all of the Q outputs of the flip-flops are true, then a flag STFLG is set to select the speed-throttle mode; otherwise, flag STFLG is cleared to select the mass airflow mode as shown in block 204.

The hybrid air charge calculation routine as shown in FIG. 2 can be a part of the background loop of an engine control strategy. In other words, it is executed once every background loop. To obtain the air charge using the mass airflow sensor, the control circuit samples the sensor once at every fixed-time interval. This is done by presetting a fixed time, such as 1 ms, in timer 19, which is continuously counted down. When timer 19 counts down to pass zero, an underflow signal is generated which triggers interrupt controller 20 and an interrupt request is issued to MPU 10, which then executes a special routine.

Figure 4:
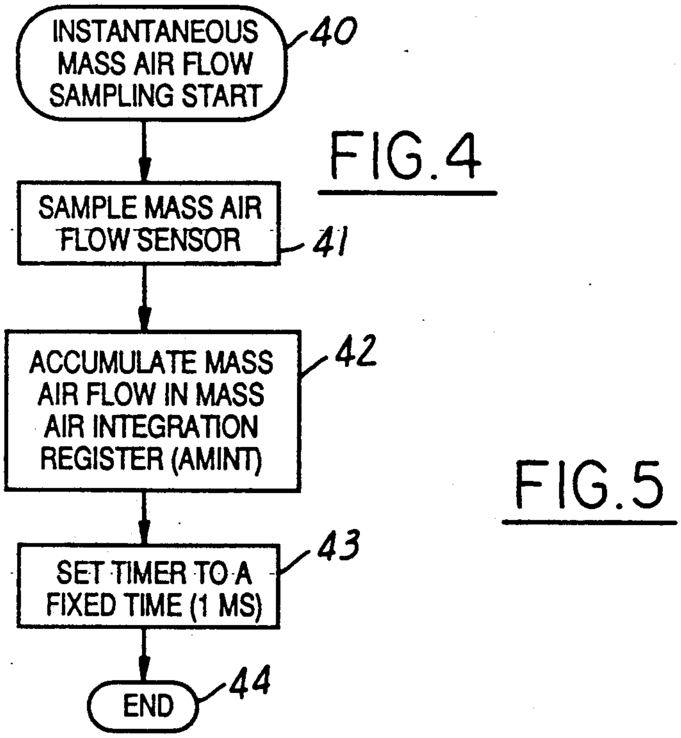
FIG. 4 is a flow chart for sampling the mass airflow sensor at fixed-time intervals.

FIG. 4 shows the flow chart for such a special routine. From a start block 40 logic flow goes to a block 41 where the mass airflow sensor is sampled; and in block 42 the instantaneous mass airflow MAF(n) is accumulated using the flowing equation:

$$AMINT = \sum_{n=1} \tfrac{1}{2} * [MAF(n) + MAF(n-1)]\,(T(n) - T(n-1))$$

where,

AMINT = Accumulated mass airflow

MAF(n) = Instantaneous mass airflow at time T(n)

T(n) = Time at the nth sampling of the mass air flow sensor

After AMINT is updated, logic flow goes to a block 43 where timer 19 is set to a fixed time, for instance 1 ms. In this way, after another fixed time period, this routine can be executed again to sample the mass airflow sensor and update the accumulated mass airflow register AMINT. Logic flow then ends at a block 44.

Figure 5:
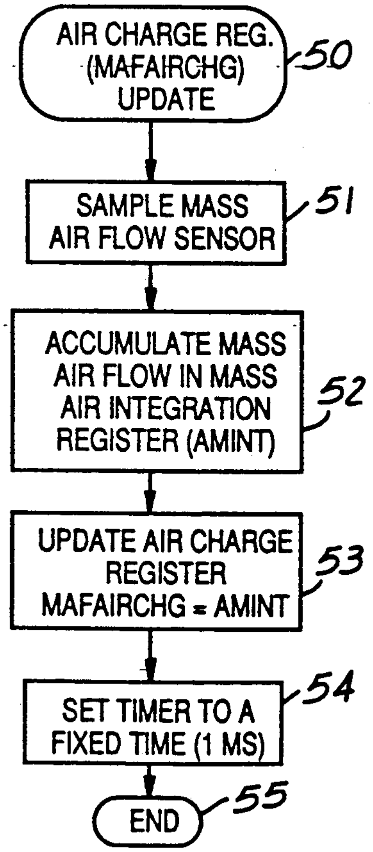
FIG. 5 is a flow charge for updating the air charge register using the mass airflow sensor means per engine intake stroke event.

At every engine intake stroke event, the mass airflow sensor is sampled once and the mass airflow is accumulated using the above equation. The resultant accumulated mass airflow AMINT is then stored as the air charge MAFAIRCHG. FIG. 5 shows the flow chart for such a routine which is activated once every engine intake stroke event starting at block 50. A signal P is sent to the interrupt controller 20 in the beginning of each intake stroke period which issues an interrupt request to MPU 10 which then executes such a special routine. In FIG. 5 blocks 51 and 52 of the flow chart perform the same function as blocks 41 and 42 (FIG. 4) for the fixed-time interval routine. In block 53 the integrated mass airflow (AMINT) is stored in MAFAIRCHG as the new air charge obtained by using the readings from the mass airflow sensor. In block 54, timer 19 is preset to the fixed time, e.g., 1 ms, so that the fixed-time routine can be executed exactly after the fixed time is elapsed. Logic flow ends at a block 55.

Various modifications and variations will no doubt occur to those skilled in the art to which this invention pertains. For example, a particular decision criteria may be varied from that disclosed herein. These and all other variations which basically rely on the teachings through which this disclosure has advanced the art are properly considered within the scope of this invention.

We claim:

1. A method of determining air charge into an internal combustion engine including the steps of:

deciding between using either a mass airflow sensor mode determination or a speed throttle mode of calculation as a function of engine RPM, throttle position, and mass airflow;

using a mass airflow sensor reading to determine air charge if the mass airflow mode has been chosen;

using a speed throttle look-up table to obtain air charge if the speed throttle mode has been chosen;

providing a first Q output from a first flip-flop having a set input of one when engine RPM is greater than a first RPM constant and having a clear input of one when RPM is less than a second RMP constant wherein the first RPM constant is the sum of an engine speed threshold necessary to exit the mass airflow mode plus an engine speed hysteresis to enter the speed throttle mode and the second RPM constant is the engine speed threshold necessary to exit the mass airflow mode;

providing a second Q output from a second flip-flop having a set input which is one when throttle position is greater than a first throttle position constant and having a clear input of one when throttle position is less than or equal to a second throttle position constant;

providing a third Q output from a third flip-flop having a set input which is one when mass airflow is greater than a first mass airflow constant and a clear input which is one when mass airflow is less than or equal to a second mass airflow constant;

coupling the three Q outputs of said first, second and third flip-flops as inputs of an AND logic; and choosing speed throttle mode when the output of the AND logic is one and choosing mass airflow mode when the output of the AND logic is zero.

2. A method as recited in claim 1 wherein the first throttle position constant is the sum of a throttle angle threshold necessary to exit the mass airflow mode plus the hysteresis constant to enter a speed throttle mode and the second throttle position constant is the throttle angle threshold necessary to exit the mass airflow mode.

3. A method as recited in claim 1 wherein the first mass airflow constant is the sum of a mass airflow threshold necessary to exit the mass airflow mode plus the hysteresis to enter a speed throttle mode and the second mass airflow constant is equal to the mass airflow threshold necessary to exit the mass airflow mode.

4. A method of determining air charge into an internal combustion engine including the steps of:

deciding between using either a mass airflow sensor mode determination or a speed throttle mode of calculation using decision criteria based on a function of engine RPM, throttle position, and mass airflow;

using mass airflow sensor reading to determine air charge if mass airflow has been chosen;

using a speed throttle look up table to obtain air charge if speed throttle has been chosen;

providing a first Q output from a first flip-flop having a set input of one when engine RPM is greater than a first RPM constant and having a clear input of one when RPM is less than a second RPM constant, the first RPM constant being the sum of an engine speed threshold necessary to exit the mass airflow mode plus an engine speed hysteresis to enter the speed throttle mode and the second RPM constant is the engine speed threshold necessary to exit the mass airflow mode;

providing a second Q output from a second flip-flop having a set input which is one when throttle position is greater than a first throttle position constant and having a clear input of one when throttle position is less than or equal to a second throttle Position constant, the first throttle position constant is the sum of a throttle angle threshold necessary to exit the mass airflow mode plus a hysteresis constant to enter the speed throttle mode and the second throttle position constant is the throttle angle threshold necessary to exit the mass airflow mode;

providing a third Q output from a third flip-flop having a set input which is one when mass airflow is greater than a first mass airflow constant and a clear input which is one when mass airflow is less than or equal to a second mass airflow constant, the first mass airflow constant is the sum of the mass airflow threshold necessary to exit the mass airflow mode plus the hysteresis to enter the speed throttle mode and the second mass airflow constant is equal to the mass airflow threshold necessary to exit the mass airflow mode;

coupling the three Q outputs of said first, second and third flip-flops as inputs of an AND circuit; and choosing speed throttle mode when the output of the AND circuit is one and choosing mass airflow when the output of the AND circuit is zero.

5. A method as recited in claim 4 further comprising sampling instantaneous mass airflow, including the steps of:

sampling mass airflow sensor;

accumulating the mass airflow in a mass airflow integration register;

setting a timer to a fixed time; and updating a air charge register by the steps of:

sampling the mass airflow sensor;

accumulating mass airflow in a mass airflow integration register;

updating the air charge register; and setting a timer to a fixed time.

6. A method of determining air charge into an internal combustion engine, including the steps of:

deciding between using either a mass airflow sensor mode determination of a speed throttle mode of calculation using decision criteria based on a function of engine RPM, throttle position, and mass airflow;

using mass airflow sensor reading to determine air charge if mass airflow has been chosen;

using a speed throttle look up table to obtain air charge if speed throttle has been chosen;

providing a first Q output from a first flip-flop having a set input of one when engine RPM is greater than a first RPM constant and having a clear input of one when RPM is less than a second RPM constant, the first RPM constant being the sum of an engine speed threshold necessary to exit the mass airflow mode plus an engine speed hysteresis to enter the speed throttle mode and the second RPM constant is the engine speed threshold necessary to exit the mass airflow mode;

providing a second Q output from a second flip-flop having a set input which is one when throttle position is greater than a first throttle position constant and having a clear input of one when throttle position is less than or equal to a second throttle position constant, the first throttle position constant is the sum of a throttle angle threshold necessary to exit the mass airflow mode plus a hysteresis constant to enter the speed throttle mode and the second throttle position constant is the throttle angle threshold necessary to exit the mass airflow mode;

providing a third Q output from a third flop-flop having a set input which is one when mass airflow is greater than a first mass airflow constant and a clear input which is one when mass airflow is less than or equal to a second mass airflow constant, the first mass airflow constant is the sum of a mass airflow threshold necessary to exit the mass airflow mode plus the hysteresis to enter the speed throttle mode and the second mass airflow constant is equal to the mass airflow threshold necessary to exit the mass airflow mode;

coupling the three Q outputs of said first, second and third flip-flops as inputs of an AND logic; and choosing speed throttle mode when the output of the AND circuit is one and choosing mass airflow when the output of the AND logic is zero;

sampling instantaneous mass airflow including the steps of:

sampling mass airflow sensor;

accumulating the mass airflow in a mass airflow integration register;

setting a timer to a fixed time;

updating an air charge register by the steps of:

sampling the mass airflow sensor;

accumulating mass airflow in a mass airflow integration register;

updating the air charge register; and setting a timer to a fixed time.

* * * * *